(12) United States Patent
Dahlfort

(10) Patent No.: US 8,463,139 B2
(45) Date of Patent: Jun. 11, 2013

(54) TRANSMITTER DISABLING DEVICE

(75) Inventor: Stefan Dahlfort, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 248 days.

(21) Appl. No.: 12/996,842

(22) PCT Filed: Jun. 19, 2008

(86) PCT No.: PCT/EP2008/004941
§ 371 (c)(1),
(2), (4) Date: Jan. 18, 2011

(87) PCT Pub. No.: WO2009/152834
PCT Pub. Date: Dec. 23, 2009

(65) Prior Publication Data
US 2011/0129217 A1  Jun. 2, 2011

(51) Int. Cl.
*H04B 10/04*  (2006.01)
*H04J 14/00*  (2006.01)

(52) U.S. Cl.
USPC ................. 398/197; 398/67; 398/72

(58) Field of Classification Search
USPC .............................. 398/67, 72, 197
See application file for complete search history.

(56) References Cited

U.S. PATENT DOCUMENTS

| | | | |
|---|---|---|---|
| 4,885,794 A | 12/1989 | Sgrignoli | |
| 5,999,549 A | 12/1999 | Freitag et al. | |
| 6,650,839 B1 | 11/2003 | Mallard, Jr. et al. | |
| 7,778,543 B2 * | 8/2010 | Ferguson et al. | 398/15 |
| 2002/0027690 A1 | 3/2002 | Bartur et al. | |
| 2006/0198635 A1 * | 9/2006 | Emery et al. | 398/38 |
| 2007/0237520 A1 * | 10/2007 | DeLew et al. | 398/17 |
| 2008/0056731 A1 * | 3/2008 | Weber et al. | 398/197 |
| 2009/0123154 A1 * | 5/2009 | Dalton et al. | 398/98 |

FOREIGN PATENT DOCUMENTS

EP  0 844 751 A2  5/1998

OTHER PUBLICATIONS

International Search Report and Written Opinion issued in corresponding International Application No. PCT/EP2008/004941, mailed Mar. 3, 2009.
Russian Official Office Action issued in corresponding Application No. 2011101739/07 dated Feb. 7, 2012.

* cited by examiner

*Primary Examiner* — Nathan Curs
(74) *Attorney, Agent, or Firm* — Potomac Patent Group, PLLC

(57) ABSTRACT

An optical transmitter disabling device for controlling an optical transmitter, particularly of an optical network termination node of a passive optical network comprising a monitoring module and a disabling module, the monitoring module being adapted to determine at least when the optical transmitter is active, the disabling module being adapted to be connected to an activation input of the optical transmitter and wherein the disabling module is adapted to interrupt an activation signal to the optical transmitter at least when the monitoring module determines that the optical transmitter is active outside of a predetermined time interval.

13 Claims, 3 Drawing Sheets

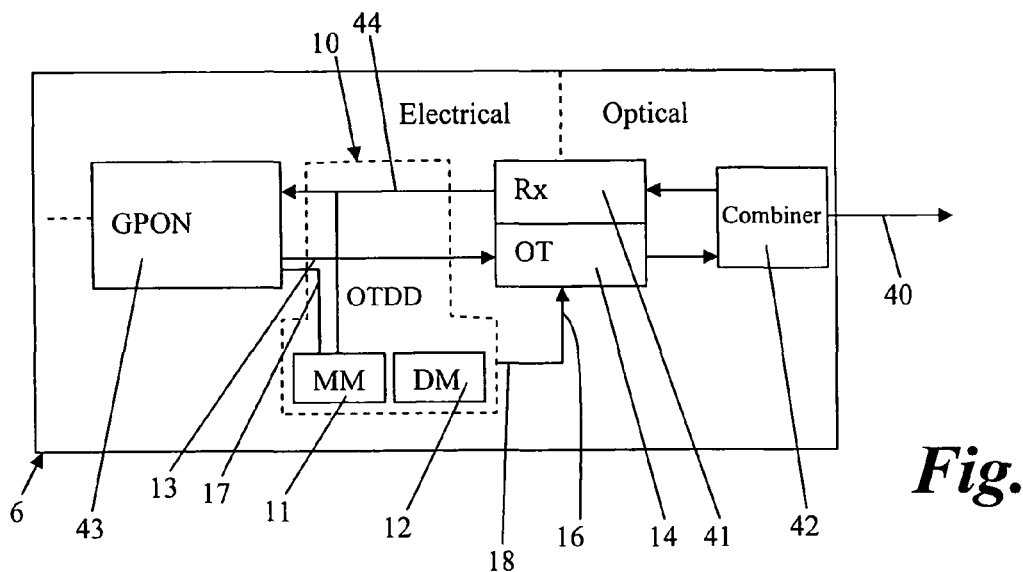
Fig. 4
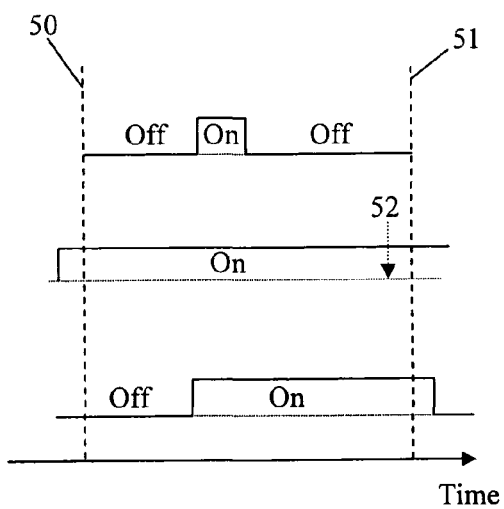
Fig. 5a
Fig. 5b
Fig. 5c

TRANSMITTER DISABLING DEVICE

TECHNICAL FIELD

This invention relates to a transmitter disabling device and, in particular, relates to an optical transmitter disabling device for integration with an optical network termination node. It also relates to an optical network termination node incorporating the transmitter disabling device, a passive optical network including such an optical network termination node and the method of operation of the transmitter disabling device.

BACKGROUND

As consumers are demanding higher bandwidth communication channels, the fibre optic communication networks of telecommunications companies are reaching closer to the end users. The extending of optical communication networks closer to the user such that the optical network replaces the more traditional copper local loop, is known as fibre to the X (FTTx). The optical fibre network may extend to a cabinet that serves a neighbourhood. Alternatively it may extend to the kerbside to serve several customers. The optical fibre based network may also extend as far as the building or to the end user's home or business. These types of optical network architectures can be realised using a Passive Optical Network.

A passive optical network has a point to multipoint architecture in which optical splitters are used such that a single optical fibre serves multiple end users. A passive optical network comprises an Optical Line Termination node (OLT) contained in the telephone exchange or central office or street side cabinet, for example, at least one optical splitter and an Optical Network Termination (ONT) at the end user's premises. Optical fibres are used to connect the optical line termination node to the optical network termination nodes. Thus, downstream signals are broadcast to all of the optical network termination nodes that are connected to the optical line termination node via the passive optical network. Upstream signals are typically based on Time Division Multiple Access communication scheme (TDMA). Thus, the end user needs to timeshare the optical medium given that only one end user can transmit at any given time. A passive optical network configuration is advantageous as it is cost effective as a minimum amount of network equipment is required to serve several end users.

However, as upstream communication on the passive optical network is timeshared using TDMA, if one optical network termination node does not obey its allocated transmission time slot, and sends continuous or unsynchronised light (ie outside its allocated time slot assigned by the optical line termination node scheduling function), this will seriously impair, or make impossible, the upstream communication for the other optical network termination nodes of the passive optical network. This scenario, with a malicious end user is sometimes referred to as a "rogue ONT". The rogue optical network termination node can operate in several ways to disrupt communication over the passive optical network.

The rogue ONT may have a continuous light source connected to the fibre optic connector that normally connects the optical network termination node to the passive optical network. This can then be used to disrupt communication for the other optical network termination nodes. Alternatively, the rogue ONT may have its software or hardware manipulated to make it emit light continuously or emit unsynchronised light.

SUMMARY

According to a first aspect of the present invention, we provide an optical transmitter disabling device for controlling an optical transmitter, comprising a monitoring module and a disabling module, the monitoring module being adapted to determine at least when the optical transmitter is active, the disabling module being adapted to be connected to an activation input of the optical transmitter and wherein the disabling module is adapted to interrupt an activation signal to the optical transmitter at least when the monitoring module determines that the optical transmitter is active outside of a predetermined time interval.

This is advantageous as the light transmitter disabling device is able to be integrated into an optical network termination node and is therefore at a low risk to tampering. The device of the present invention will operate even if the optical network termination node is failing to react or respond to management messages. Further, as the disabling module is connected to the activation input of the optical transmitter, it is very difficult for a malicious end user to bypass the disabling device.

The activation input may be a power supply input or a data signal input or enable/disable input to the optical transmitter. This is advantageous as the disabling device is able to interrupt the signal that activates the optical transmitter, without having to rely upon the correct operation of any other components to deactivate the optical transmitter.

The disabling module may be adapted to interrupt the activation signal to the activation input when the monitor module determines that the activation signal has been active for a period of time greater than the predetermined time period. This is advantageous as the upstream communication on a passive optical network, for example, uses time division multiple access and therefore it is expected that the optical transmitter would only be active for limited periods of time. If the optical transmitter transmits for longer than a predetermined time it can be concluded that it is not transmitting in its designated timeslot and can be disabled accordingly.

The optical transmitter disabling device may comprise a high-pass filter. This is advantageous as extremely simple and low-cost electronics can be used to disable the optical transmitter of a rogue optical network termination node.

The predetermined time interval may be a period of time within which the optical transmitter is allowed to transmit by virtue of a timeslot of a channel access method and wherein the disabling module is adapted to interrupt the activation signal if it is present outside of the timeslot. This is advantageous as the optical transmitter disabling device can have comprehensive control over the optical transmitter to ensure that the passive optical network is reliable.

The optical transmitter disabling device may be integrated into an optical network termination node of a passive optical network. This allows more reliable operation of the passive optical network.

The monitoring module may be adapted to monitor the signals received by the optical network termination node to determine the predetermined time interval. This is advantageous as the monitoring module does not require pre-programming as it can determine the predetermined time interval itself. Specifically, the monitoring module may be adapted to determine the frame boundaries and the allocated time slot allowed for transmission.

According to a second aspect of the invention, we provide an optical network termination node comprising an optical transmitter and an activation signal generator, the optical transmitter arranged to transmit light on receipt of an activation signal from the activation signal generator, and an optical transmitter disabling device comprising a monitoring module and a disabling module, the monitoring module adapted to determine at least when the optical transmitter is active, the disabling module is connected to an activation input of the optical transmitter and wherein the disabling module is arranged to interrupt the activation signal to the optical transmitter at least when the monitoring module determines that the optical transmitter is active outside of a predetermined time interval.

According to a third aspect of the invention, we provide a method for controlling an optical transmitter, the optical transmitter adapted to be activated by an activation signal, the method comprising the steps of;

monitoring at least when the optical transmitter is active;
determining whether or not the optical transmitter is active outside of a predetermined time interval; and
if optical transmitter is active outside of a predetermined time interval the interrupt an activation signal to the optical transmitter.

This is advantageous as the method can check whether the optical transmitter is transmitting when it should not be and, if it is, interrupt the signal that causes it to transmit.

BRIEF DESCRIPTION OF THE DRAWINGS

There now follows by way of example only a detailed description of the present invention with reference to the accompanying drawings in which;

FIG. 4 shows a second embodiment of the invention;
FIGS. 5a, 5b and 5c show different activation signals that may be received by the optical transmitter disabling device.

DETAILED DESCRIPTION

Figure 1:
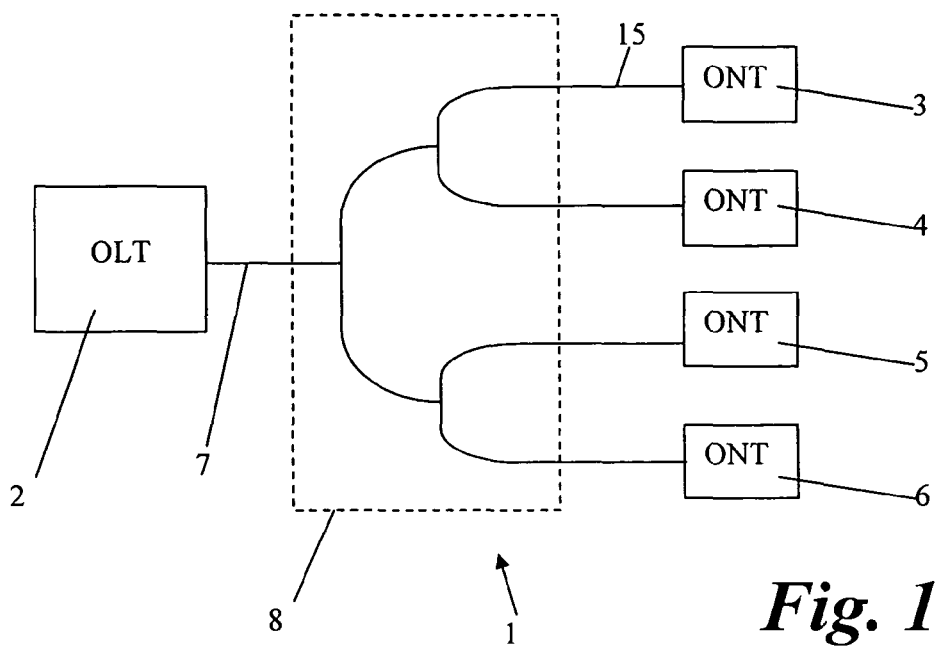
FIG. 1 shows a passive optical network.

FIG. 1 shows an example of a passive optical network 1 used for fibre to the X network architectures. The passive optical network 1 comprises an optical line termination node 2 connected to a plurality of optical network termination nodes 3, 4, 5, 6. The output 7 from the optical line termination node is split by a splitter 8 such that optical line termination node 2 is connected to each of the optical network terminals 3, 4, 5, 6. Downstream communication, i.e. from the optical line termination node 2 to one of the optical network termination nodes 3, 4, 5, 6 is sent to all of the optical network termination nodes. Thus, each optical network termination node 3, 4, 5, 6 must discard messages that are not intended for it. Upstream communication is typically implemented using a multiple access scheme such as time division multiple access (TDMA). This allows each of the optical network termination nodes to send messages in a predetermined timeslot. This avoids data collisions when the separate optical links converge in the splitter 8. However, if one of the optical network termination nodes 3, 4, 5, 6 does not obey its timeslot communication can be disrupted for the other nodes. Further, if the optical transmitter of one of the optical network termination nodes is permanently active then this can make communication for the other nodes impossible.

Figure 2:
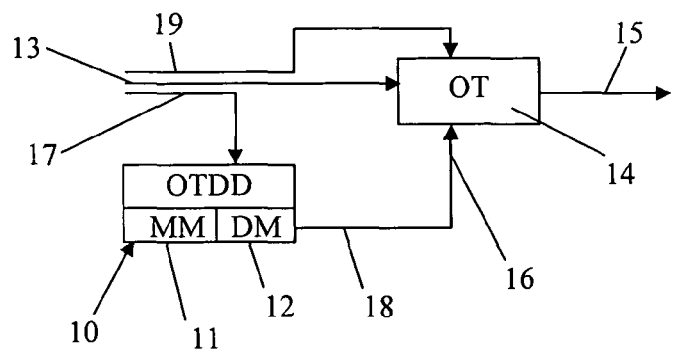
FIG. 2 shows a first embodiment of the present invention.

FIG. 2 shows an embodiment of an optical transmitter disabling device 10 integrated into an optical network termination node of a passive optical network. The optical transmitter disabling device 10 is integrated with an optical transmitter 14, which comprises a laser diode. The optical transmitter disabling device 10 comprises a monitoring module 11 and a disabling module 12. The monitoring module 11 is connected to one of the activation lines 13, 17, 19 that supplies activation signals to the optical transmitter 14. In particular, the monitoring module is connected to the activation line 17, which supplies data signals to the optical transmitter 14. When activation data signals are supplied along the activation line 17 the optical transmitter 14 emits light in accordance with those signals. While the activation signals in this embodiment are the data signals, the activation signal may be the signal carried on line 13 to the enable/disable input of the optical transmitter 14 that enables and disables the transmitter, or the signal carried on line 19, which comprises the power supply to the optical transmitter. The laser diode 14 is coupled to a fibre optic cable 15 which connects the optical network termination node to the passive optical network 1. The disabling module 12 is connected to an activation input 16 of the laser 14, via an output line 18. Thus, the optical transmitter disabling device 10 is located in the activation line 17 for the laser 14, which makes it difficult to tamper with. In particular, the optical transmitter disabling device 10 is located such that it is between the activation signal generation device that supplies the activation signal and the optical transmitter 14.

Figure 3:
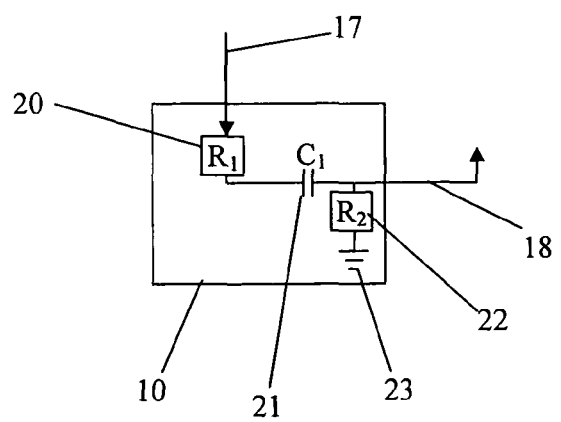
FIG. 3 shows the structure of the monitoring module and disabling module shown in FIG. 2.

The form of the light transmitter disabling device 10 is shown in FIG. 3. In this embodiment, the monitoring module 11 and the disabling module 12 comprise an RC circuit comprising a first resistor 20, a capacitor 21 and a second resistor 22. The first resistor 20 receives the activation signals from line 17. The capacitor 21 is connected to the output line 18 from the disabling device 10. The first resistor 20 and the capacitor 21 are connected in series. The second resistor 22 is connected between an earth 23 and the output line 18. The first resistor 20, the capacitor 21 and the second resistor 22 form a high pass filter. The values of the first resistor 20, capacitor 21 and the second resistor 22 are chosen such that the activation signal to the activation input 16 is interrupted if the laser remains on (i.e. emitting light) for longer than a predetermined time. The predetermined time interval in this embodiment is the length of time of a TDMA timeslot, which is time that an optical network termination node is allowed to transmit and is typically 125 microseconds. Thus, an activation signal (i.e. the data signal) that persists (i.e. carries data) for longer than a timeslot is considered to impair the upstream communication over the passive optical network. The values of the first resistor 20, capacitor 21 and the second resistor 22 are also chosen so that the disabling device 10 has a high impedance to the activation signal so that it does not disrupt the impedance matching of that line 17. In the present embodiment, the first resistor 10 has a value of 10 kOhms, capacitor 11 has a value of 1 nF and resistor 12 has a value of 16 kOhms.

The activation (i.e. data) signal 13 comprises high speed data of approximately 1.25 gigabits per second, for example, and thus has the form of high frequency logic 1 and logic 0 periods. The disabling device 10 of this embodiment has a bandwidth that is lower than this and therefore the pulses are ignored by the device and only when the optical transmitter is permanently on will the disabling module 12 interrupt the activation signal and thereby disable the optical transmitter 14. It will be appreciated that the components of the disabling device of FIG. 3 are chosen to suit the speed of the data transmission so that the device can operate reliably at 2.5 gigabits per second or 10 gigabits per second, for example.

The disabling device 10 of FIGS. 2 and 3 is able to disable the optical transmitter 14 if the activation signal persists for longer the predetermined time. Thus, the disabling device of this embodiment can effectively prevent disruption to the passive optical network caused by a rogue optical network terminal that has its laser continuously on.

FIG. 4 shows a second embodiment of the optical transmitter disabling device 10. The same reference numerals have been used for features present in the previous embodiment. A portion of the optical network termination node 6 is shown comprising an optical transmitter 14 in combination with an optical receiver 41. The optical transmitter 14 comprises a laser diode, although it may comprise other light sources. The optical signals from and to the transmitter 14 and receiver 41 are coupled to the passive optical network by a combiner 42. The transmitter 14 and the receiver 41 are also connected to the processing circuitry of the optical network termination node, which is shown in FIG. 4 as gigabit passive optical network (GPON) circuitry 43. The GPON circuitry 43 is connected to the laser diode 14 by the activation lines 13 and 17 (the power supply line is not shown in this embodiment). Activation line 13 comprises an enable/disable line that enables and disables the optical transmitter 14. The activation line 17 comprises the data signal line. The receiver 41 is connected to the GPON circuitry 43 by a receiver line 44. Thus, the optical transmitter disabling device 10 of this embodiment is connected between the GPON circuitry 43 and the transmitter 14 and receiver 41. The GPON circuitry 43 generates the activation signals and therefore the optical transmitter disabling device 10 is located between the activation signal generator and the optical transmitter 14.

The optical transmitter disabling device 10 comprises a monitoring module 11 and a disabling module 12. As in the previous embodiment the monitoring module 11 is connected to the activation line 17. In this embodiment the monitoring module 11 is also connected to the receiver line 44. The disabling module 12 is connected between the activation line 17 and the output line 18 that is connected to the activation input 16 of the laser 14.

The monitoring module 11 is adapted to monitor the receiver line 44 for management messages sent over the passive optical network. In particular, the monitoring means 11 extracts information received by the optical network termination node regarding the TDMA frame boundaries, details of the timeslot allocated to that particular optical network termination node and the optical network termination node equalization delay. Based on this information the monitoring module 11 can instruct the disabling module 12 to interrupt the activation line 17 to the activation input 16 for time periods outside the timeslot for that particular optical network termination node. Thus, an activation signal sent to the laser 14 outside of its permitted timeslot would be blocked by the disabling module 12 thereby disabling the laser 14.

FIGS. 5a, 5b and 5c show examples of the activation signals received by the light transmitter disabling device 10 of FIG. 3 and FIG. 4. In FIGS. 5a to 5c a TDMA timeslot for a particular optical network termination node is represented by time between the dashed lines 50 and 51. This timeslot is read from the receiver line 44 by the monitoring module 11 in the embodiment of FIG. 4. The predetermined time period of the embodiment of FIG. 3 is set as the time period between dashed lines 50 and 51, namely 125 µs. It will be appreciated by those skilled in the art that different time periods are possible, as the choice of the predetermined time period will depend on the configuration of the passive optical network.

In FIG. 5a an activation signal is present for less than 125 µs and within the timeslot. In this case the optical network termination node is not considered to be rogue and the disabling module 12 does not interrupt the activation signal in either of the embodiments.

In FIG. 5b, the activation signal remains on continuously. In the embodiment of FIG. 3, the monitoring module 11 will interrupt the activation signal, thereby disabling the optical transmitter 14, when the activation signal persists for longer than the predetermined time period, i.e. at point 52. If at a later time the activation signal ceases, the disabling module 12 will allow the laser 14 to be activated once again and the monitoring module will continue to determine if the laser remains active for longer than a predetermined time.

In the embodiment of FIG. 4, the monitoring module 11 has knowledge of when the TDMA timeslot begins and ends and therefore instructs the disabling module 12 to interrupt the activation signal for the time period prior to the beginning of the timeslot 50 and after the end of the timeslot 51. If at a later time the activation signal ceases, the disabling module continues to disable the laser 14 for a predetermined hold-off time, which may be determined by the operator, and then normal operation as discussed above would be resumed. If the disabling device 12 is required to interrupt the signals 17 repeatedly, the monitor module is arranged to disable the laser 14 permanently. The optical network termination node would then need to be replaced. It will be appreciated that the disabling device 12 may alternatively be arranged to continue disabling the laser 14 for the predetermined hold-off time instead of disabling it permanently or take any other action that the network operator desires.

FIG. 5c shows an activation signal that remains on for a time period less than one timeslot, but persists outside the end of the timeslot 51. In the embodiment of FIG. 3, the activation signal will not be interrupted as the activation signal has not persisted for longer than the TDMA timeslot.

However, in the embodiment of FIG. 4, the monitoring module 11 determines that the optical network termination node is rogue once the activation signal persist outside of the end of the timeslot 51 and therefore instructs the disabling module 12 to interrupt the activation signal at point 51.

Figure 6:
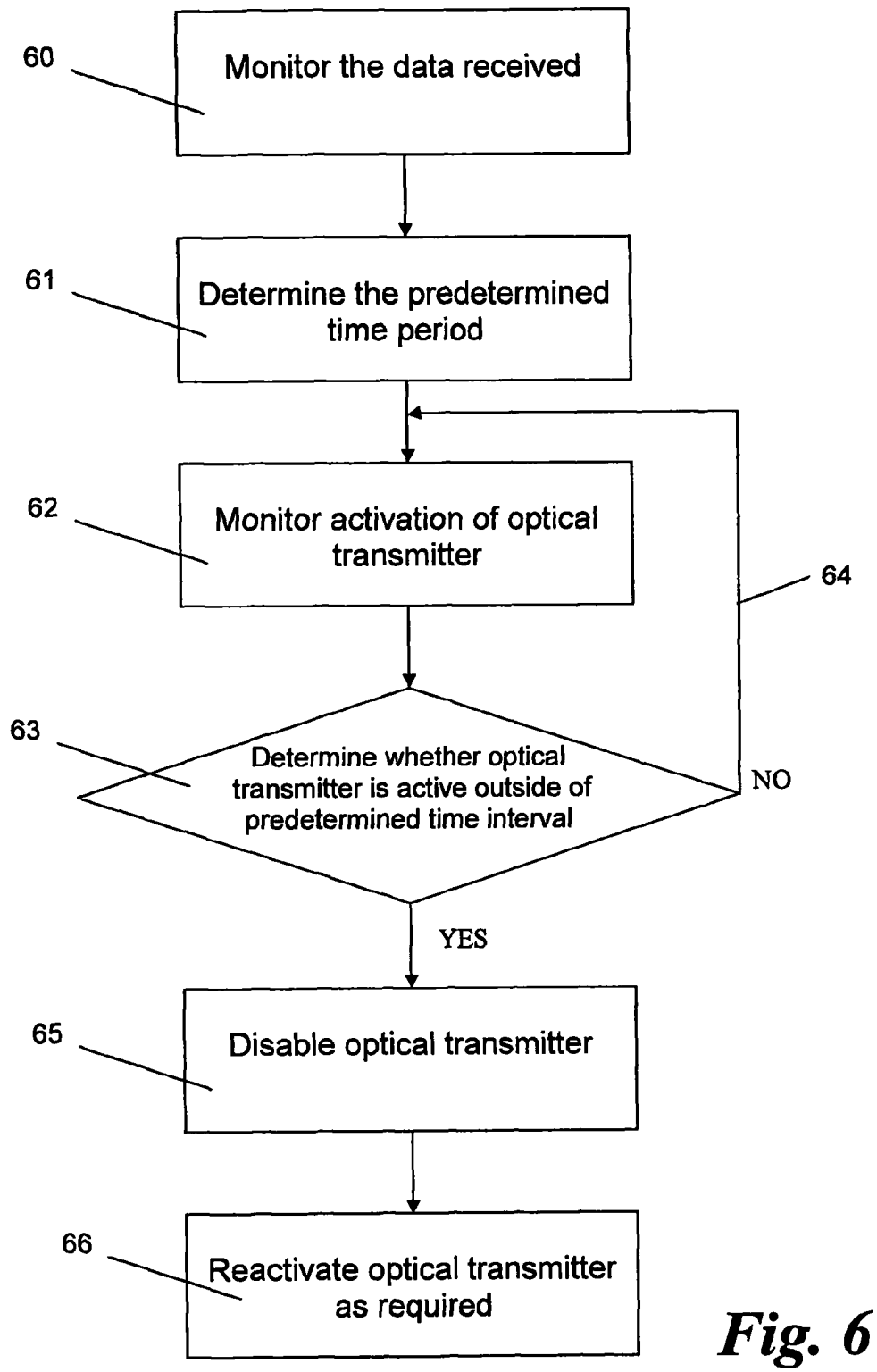
FIG. 6 shows a flow chart of the operation of the optical transmitter disabling device.

FIG. 6 shows the method of operation of the optical transmitter disabling device 10. In step 60 the monitoring means 11 monitors the incoming signals from the passive optical network on the receiver line 44. At step 61 the monitoring means 11 discovers the frame boundaries and the allocated time slot the optical network termination node is allowed to transmit in. In the first embodiment, step 61 is predetermined by the choice of the values of the first resistor 20, second resistor 22 and capacitor 21. Step 62 involves monitoring when the optical transmitter is active. Both of the embodiments discussed above monitor the data signal activation line 17 to do this. However, it will be appreciated that a different activation line 13, 17, 19 could be monitored or the output of the optical transmitter 14 could be monitored, or any other appropriate way. Step 63 shows the monitoring module 11 determining whether or not the optical transmitter 14 is active outside of the predetermined time interval. In the first embodiment, this is determined by the length of time that the optical transmitter is active. In the second embodiment, the monitoring module has knowledge of when the optical transmitter should and should not be transmitting. If the transmitter is determined to be transmitting outside of the predetermined time interval in which it is allowed to transmit, the method proceeds to step 65. At step 65, the optical transmitter 14 is disabled by, for example, interrupting the data signals sent to the optical transmitter. If the optical transmitter is only active within the bounds set by the predetermined time interval, the method returns at step 64 to continue monitoring. At step 66, the optical transmitter 14 may be reactivated and the monitoring means 11 will continue to monitor. Alternatively, the optical transmitter 14 may be disabled permanently or only reactivated after a hold-off time period.

The invention claimed is:

1. An optical transmitter disabling device for controlling an optical transmitter, comprising:
   a monitoring module being adapted to determine at least when the optical transmitter is active; and
   a disabling module being adapted to be connected to an activation input of the optical transmitter and wherein the disabling module is further adapted to interrupt an activation signal to the optical transmitter at least when the monitoring module determines that the optical transmitter is active outside of a predetermined time interval, wherein
      the monitoring module and disabling module are further adapted to receive an activation signal prior to the optical transmitter receiving the activation signal.

2. An optical transmitter disabling device according to claim 1, in which the activation input is a power supply input.

3. An optical transmitter disabling device according to claim 1, in which the activation input is a data signal input to the optical transmitter.

4. An optical transmitter disabling device according to claim 1, in which the activation input is an enable/disable signal input to the optical transmitter.

5. An optical transmitter disabling device according to claim 1, in which the disabling module is adapted to interrupt the activation signal to the activation input when the monitor module determines that the activation signal has been active for a period of time greater than the predetermined time period.

6. An optical transmitter disabling device according to claim 1, in which the device comprises a high-pass filter.

7. An optical transmitter disabling device according to claim 1, in which the predetermined time interval is a period of time within which the optical transmitter is allowed to transmit by virtue of a timeslot of a channel access method and wherein the disabling module is adapted to interrupt the activation signal if it is present outside of the timeslot.

8. An optical transmitter disabling device according to claim 1, in which the optical transmitter disabling device is integrated into an optical network termination node of a passive optical network.

9. An optical transmitter disabling device according to claim 8, in which the monitoring module is adapted to monitor the signals received by the optical network termination node to determine the predetermined time interval.

10. An optical transmitter disabling device according to claim 9, in which the monitoring module is adapted to determine one or more frame boundaries and an allocated time slot allowed for transmission.

11. An optical network termination node comprising:
    an optical transmitter arranged to transmit light on receipt of an activation signal from an activation signal generator, and:
    an optical transmitter disabling device comprising
       a monitoring module adapted to determine at least when the optical transmitter is active, and;
       a disabling module connected to an activation input of the optical transmitter and wherein the disabling module is arranged to interrupt the activation signal to the optical transmitter at least when the monitoring module determines that the optical transmitter is active outside of a predetermined time interval, wherein
       the monitoring module and disabling module are further adapted to receive an activation signal prior to the optical transmitter receiving the activation signal.

12. A method for controlling an optical transmitter, the optical transmitter adapted to be activated by an activation signal, the method comprising the steps of:
    monitoring at least when the optical transmitter is active;
    determining whether or not the optical transmitter is active outside of a predetermined time interval; and
    if the optical transmitter is active outside of a predetermined time interval then interrupting an activation signal to the optical transmitter, and
    receiving the activation signal by a monitoring module and disabling module prior to receiving the activation signal at an optical transmitter.

13. A passive optical network comprising an optical network termination node as defined in claim 11.

* * * * *

UNITED STATES PATENT AND TRADEMARK OFFICE
CERTIFICATE OF CORRECTION

PATENT NO. : 8,463,139 B2
APPLICATION NO. : 12/996842
DATED : June 11, 2013
INVENTOR(S) : Dahlfort Page 1 of 1

It is certified that error appears in the above-identified patent and that said Letters Patent is hereby corrected as shown below:

In the Specification

In Column 1, Line 48, delete "ie" and insert -- i.e. --, therefor.

In Column 2, Line 5, delete "t ransmitter" and insert -- transmitter --, therefor.

In Column 4, Line 49, delete "resistor 10" and insert -- resistor 20 --, therefor.

In Column 4, Line 50, delete "capacitor 11" and insert -- capacitor 21 --, therefor.

In Column 4, Line 50, delete "resistor 12" and insert -- second resistor 22 --, therefor.

In Column 6, Line 20, delete "device 12" and insert -- device 10 --, therefor.

In Column 6, Line 24, delete "device 12" and insert -- device 10 --, therefor.

Signed and Sealed this
Fifth Day of November, 2013

Teresa Stanek Rea
*Deputy Director of the United States Patent and Trademark Office*